United States Patent
Zuckerberg et al.

(10) Patent No.: US 8,352,859 B2
(45) Date of Patent: *Jan. 8, 2013

(54) DYNAMICALLY PROVIDING A FEED OF STORIES ABOUT A USER OF A SOCIAL NETWORKING SYSTEM

(75) Inventors: Mark Zuckerberg, Palo Alto, CA (US); Ruchi Sanghvi, Palo Alto, CA (US); Andrew Bosworth, Palo Alto, CA (US); Chris Cox, Palo Alto, CA (US); Aaron Sittig, Palo Alto, CA (US); Chris Hughes, Palo Alto, CA (US); Katie Germinder, San Jose, CA (US); Dan Corson, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 12/703,199

(22) Filed: Feb. 10, 2010

(65) Prior Publication Data

US 2010/0146443 A1    Jun. 10, 2010

Related U.S. Application Data

(63) Continuation of application No. 11/503,242, filed on Aug. 11, 2006, now Pat. No. 7,669,123.

(51) Int. Cl.
*G06F 17/00* (2006.01)
(52) U.S. Cl. .......................................... 715/273
(58) Field of Classification Search .................. 715/200, 715/273
See application file for complete search history.

(56) References Cited

U.S. PATENT DOCUMENTS

| | | | |
|---|---|---|---|
| 7,107,264 B2 * | 9/2006 | Lu | 1/1 |
| 7,558,777 B1 * | 7/2009 | Santos | 1/1 |
| 8,145,679 B1 * | 3/2012 | Baluja et al. | 707/802 |
| 2004/0194034 A1 * | 9/2004 | Vlamis | 715/530 |
| 2005/0033615 A1 * | 2/2005 | Nguyen et al. | 705/5 |
| 2005/0169255 A1 * | 8/2005 | Shimomura et al. | 370/352 |
| 2005/0169558 A1 * | 8/2005 | Dance et al. | 382/305 |
| 2006/0259537 A1 * | 11/2006 | Emberton et al. | 709/200 |
| 2007/0132767 A1 * | 6/2007 | Wright et al. | 345/475 |
| 2007/0174389 A1 | 7/2007 | Armstrong et al. | |

(Continued)

FOREIGN PATENT DOCUMENTS

| | | |
|---|---|---|
| JP | 2006-185257 | 7/2006 |
| WO | WO 2007/052285 | 5/2007 |
| WO | WO 2007/081958 | 7/2007 |

OTHER PUBLICATIONS

Ellis et al., Designing Palaver Tree Online: Supporting Social Roles in a Community of Oral History, ACM 2001, pp. 474-480.*

(Continued)

*Primary Examiner* — Cong-Lac Huynh
(74) *Attorney, Agent, or Firm* — Fenwick & West LLP

(57) ABSTRACT

To display a news feed in a social network environment, a social networking system generates news items regarding activities associated with a user of a social network environment. The social networking system may also attach an informational link associated with at least one of the activities to at least one of the news items, limit access to the news items to a predetermined set of viewers, and assign an order to the news items. The news items may be displayed in the assigned order to at least one viewing user of the predetermined set of viewers, and the number of news items displayed may be dynamically limited.

29 Claims, 5 Drawing Sheets

U.S. PATENT DOCUMENTS

| | | | |
|---|---|---|---|
| 2007/0180027 A1* | 8/2007 | Boylan | 709/204 |
| 2007/0250791 A1* | 10/2007 | Halliday et al. | 715/808 |
| 2007/0261071 A1* | 11/2007 | Lunt et al. | 725/13 |
| 2008/0243532 A1* | 10/2008 | Leach et al. | 705/1 |
| 2010/0030734 A1 | 2/2010 | Chunilal | |
| 2010/0205179 A1* | 8/2010 | Carson et al. | 707/740 |
| 2011/0038597 A1* | 2/2011 | McCallister et al. | 386/239 |
| 2011/0153412 A1* | 6/2011 | Novikov et al. | 705/14.42 |
| 2011/0153421 A1* | 6/2011 | Novikov et al. | 705/14.52 |
| 2011/0154223 A1* | 6/2011 | Whitnah et al. | 715/753 |
| 2012/0101898 A1* | 4/2012 | Kendall et al. | 705/14.52 |
| 2012/0233009 A1* | 9/2012 | Fougner et al. | 705/26.3 |
| 2012/0239619 A9* | 9/2012 | Hersh et al. | 707/628 |

OTHER PUBLICATIONS

Pempek et al., College Students' Social Networking Experiences on Facebook, Elsevier 2009, pp. 227-238.*

Baden et al., Persona: An Online Social Network with User-Defined Privacy, ACM 2009, pp. 135-146.*

Canadian Intellectual Property Office, Office Action, Canadian Patent Application No. 2,660,539, Feb. 1, 2011, three pages.

Canadian Intellectual Property Office, Office Action, Canadian Patent Application No. 2,660,539, Sep. 26, 2011, three pages.

Australian Patent Office, Examiner's First Report, Australian Patent No. 2007-284810, Jun. 22, 2010, two pages.

Japanese Patent Office, Office Action, Japanese Patent No. JP 2009-523823, Sep. 7, 2010, nine pages.

Nishino, S., "What is Social Network?—Expanding a Circle of Friends Via the Net—vol. 2: What Can We Do with Social Network Service?," BB Watch, Nov. 4, 2004, [Online] [Retrieved Aug. 24, 2010] Retrieved from the Internet <URL: http://bb.watch.impress.co.jp/column/socialn/2004/11/04/ >.

Yamato, T., "Introduction to Online Soft Making Your Broadband More Comfortable! Attractive Internet Tools," *PC Japan*, Jul. 1, 2005, vol. 10, Issue No. 7, pp. 144-147, Softbank Publishing Kabushiki Kaisha, Japan.

* cited by examiner

DYNAMICALLY PROVIDING A FEED OF STORIES ABOUT A USER OF A SOCIAL NETWORKING SYSTEM

CROSS REFERENCE TO RELATED APPLICATIONS

This application is a continuation of U.S. application Ser. No. 11/503,242, filed Aug. 11, 2006, now U.S. Pat. No. 7,669,123, which is incorporated by reference in its entirety.

BACKGROUND

The present invention relates generally to dynamic news presentation in a social network, and more particularly to systems and methods for dynamically presenting a news feed about a particular person.

Conventionally, a user of a networking website connects with other users by providing information about the user to a social network website for access by the other users. For example, a user may post contact information, background information, current job position, hobbies, and so forth. Other users may contact the user and/or review information about the user based on common interests or for any other reason.

Recently, social networking websites have developed systems for tailoring connections between various users. For example, users may be grouped based on geographical location, job type, and so forth. Social networking offers users the opportunity for frequent, automatic notification of changes in the information posted by other users. In other words, rather than having to initiate calls or emails to learn news of another user, a user of a social networking website may passively receive alerts to new postings by other users.

There are existing mechanisms that allow a user to display information about other users. Some mechanisms may allow the user to select particular news items for immediate viewing. Typically, however, these news items are disparate and disorganized. In other words, the user must spend time researching a news topic by searching for, identifying, and reading individual news items that are not presented in a coherent, consolidated manner. Often, many of the news are not relevant to the user. Just as often, the user remains unaware of the existence of some news items that were not captured in the user's research. What is needed is an automatically generated display that contains information relevant to a user about another user of a social network.

SUMMARY

A method for displaying a news feed in a social network environment is described. In some embodiments, the method includes generating news items regarding activities associated with a user of a social network environment and attaching an informational link associated with at least one of the activities, to at least one of the news items. The method further includes limiting access to the news items to a predetermined set of viewers and assigning an order to the news items. The method further includes displaying the news items in the assigned order to at least one viewing user of the predetermined set of viewers.

DETAILED DESCRIPTION

A system and method for dynamically presenting a news feed about activities of a user of a social network is provided. A user (the viewing user) of a social network may choose to view a news feed about another user (the subject user) in the social network. A list of the subject user's activities within the social network may be drawn from various databases within the social network. The news feed is automatically generated based on the list of activities. The list of activities may be filtered, for example, according to priority settings of the viewing user and/or privacy setting of the subject user. The list of activities may be displayed as a list of news items presented in a preferred order (e.g., chronological, prioritized, alphabetical, and the like). Various news items in the news feed may include items of media content and/or links to media content illustrating the activities of the subject user. The news items may also include links enabling the viewing user to participate in the subject user's activities. The news feed may be continuously updated by adding news items about new activities and/or removing news items about previous activities. Accordingly, the viewing user may be better able to follow the "track" of the subject user's "footprints" through the social network, based on the news feed, without requiring the subject user to continuously post new activities.

Figure 1:
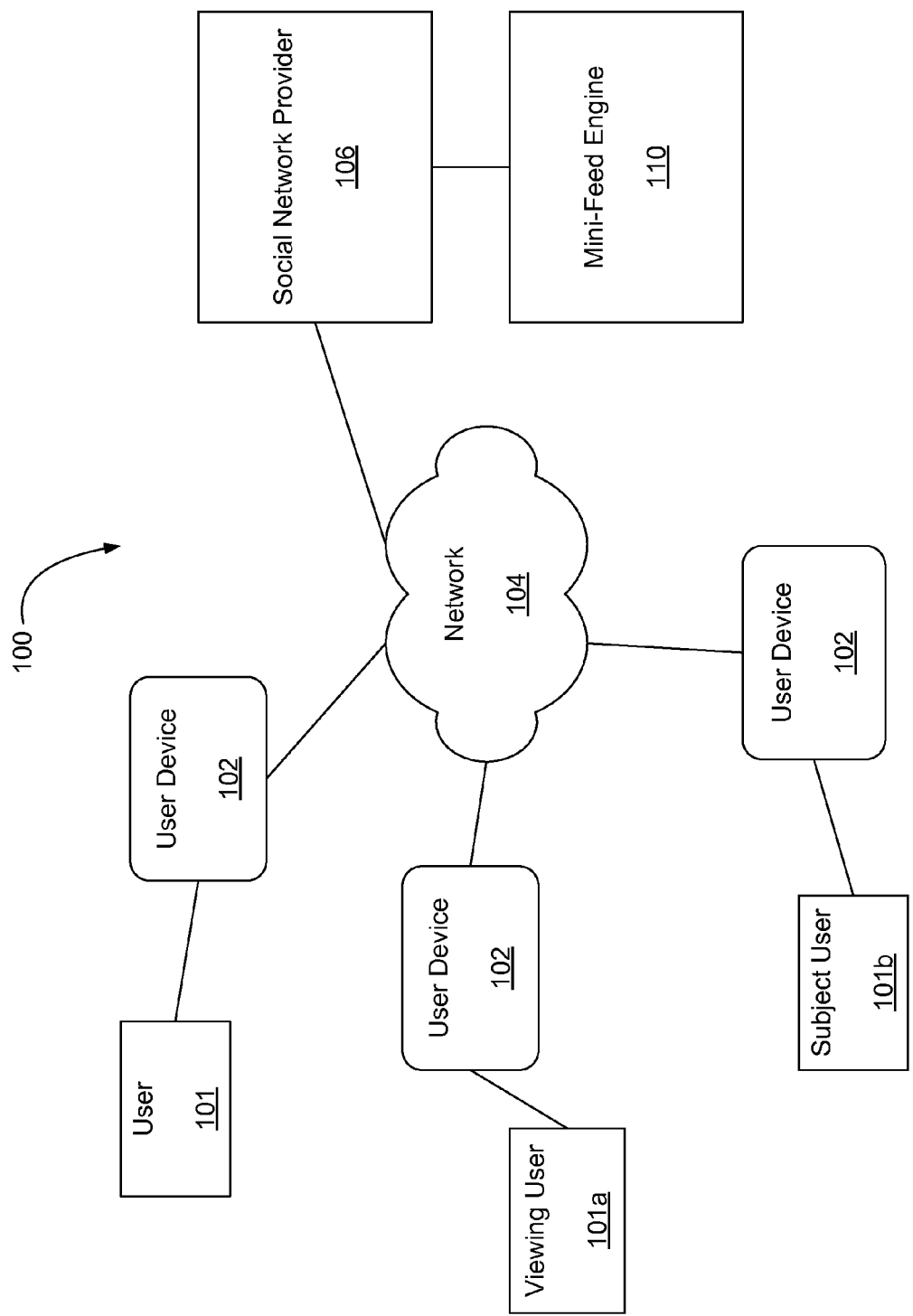
FIG. 1 illustrates an exemplary environment for generating a news feed in a social network environment.

FIG. 1 illustrates an exemplary environment 100 for generating a news feed in a social network environment. One or more users, such as users 101 at user devices 102, are coupled to a social network provider 106 via a network 104. The social network provider 106 may comprise any user or entity that provides social networking services, communication services, dating services, company intranets, and so forth. For example, the social network provider 106 may host a website that allows one or more users 101, at one or more user devices 102, to communicate with one another via the website. The social networking website offers a first user 101 an opportunity to connect or reconnect with the one or more other users 101 that attended, for example, the same university as the first user 101. In some embodiments a social network environment may include a segmented community. A segmented community according to one embodiment is a separate, exclusive or semi-exclusive web-based social network wherein each authenticated segmented community member accesses and interacts with other members of their respective segmented community.

In one instance, a viewing user 101*a* associated with a user device 102 requests a news feed (i.e., mini-feed) about a subject user 101*b* associated with a second user device 102 via a social networking website associated with the social network provider 106. Any user 101 in the social network may request a mini-feed and become the viewing user 101*a* or become the subject user 101*b* as the subject of a mini-feed request. In some embodiments, the viewing user 101*a* and the subject user 101*b* may be the same user, for example, for purposes of reviewing a personal mini-feed.

A mini-feed engine 110 is coupled to the social network provider 106. The mini-feed engine 110 utilizes data about a particular user (e.g., the subject user 101*b*), to assemble a list of one or more items of media content or any other content for display to a user such as the viewing user 101*a*. Examples of a subject user 101*b* may include a user, an association of users (e.g., a family), a group of users, an organization of users (e.g., a volleyball team), members of an event (e.g., a concert), students in a class (e.g., "Elementary Political Speaking and The Causes of Global Warming"), members of a club (e.g., Fans of Global Warming), and the like. According to some embodiments, the viewing user 101*a* may be coupled directly via the user device 102 to the mini-feed engine 110. According to other embodiments, the mini-feed engine 110 comprises a module associated with the social network provider 106.

Figure 2:
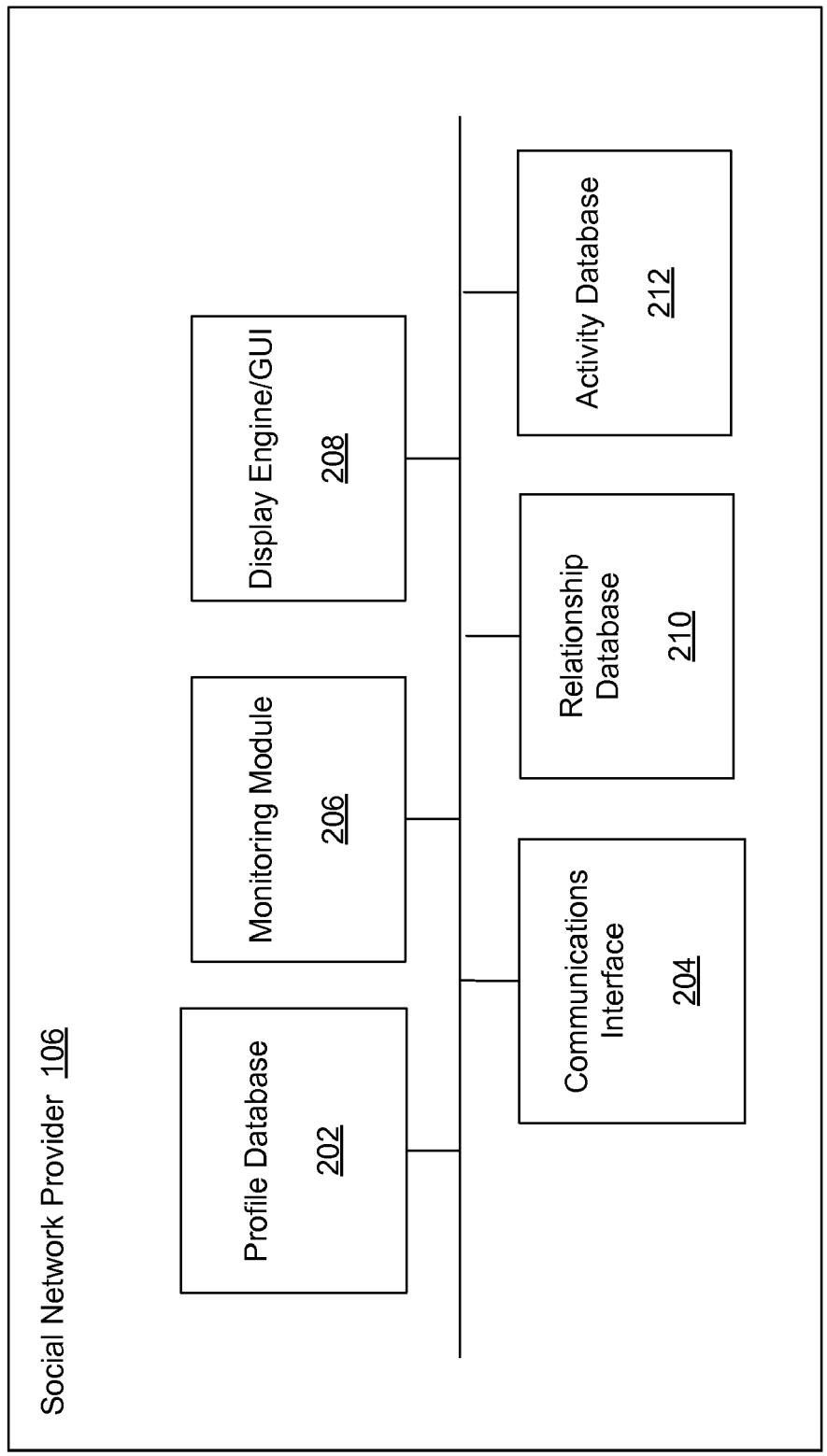
FIG. 2 is a block diagram of an exemplary social network provider.

Referring now to FIG. 2, a block diagram of an exemplary social network provider, such as the social network provider 106 shown in FIG. 1, is shown. A profile database 202 is provided for storing data associated with each of the users, such as the user 101 associated with user device 102. When a user 101 subscribes to services provided by the social network provider 106, a user profile may be generated for user 101. For example, the user 101 may select privacy settings, provide contact information, provide personal statistics, specify memberships in various organizations, indicate interests, list affiliations, post class schedules, detail work activities, or group other users 101 according to one or more categories. When the user 101 adds additional information to the user profile, such as adding additional contacts, the user profile in the profile database 202 may be updated with the information added. The user profile may be stored, modified, added, and so forth to any storage medium. A timestamp may be associated with the user profile. Examples of timestamp include order of occurrence in a data base, date, time of day, and the like.

According to some embodiments, the user profile is created outside of the social network environment and provided to or accessed by the social network provider 106. Alternatively, the profile database 202 may be located remotely and accessed by the social network provider 106.

The social network provider 106 includes a communications interface 204 for communicating with users 101, such as via the user device 102 described herein, over the network 104. The user device 102 communicates various types of information, such as privacy settings selections, groupings of other users 101, and so forth, to the social network provider 106 via the communications interface 204. Any type of communications interface 204 is within the scope of various embodiments.

A monitoring module 206 tracks one or more user activities on the social networking website. For example, the monitoring module 206 can track user interaction with one or more items of media content, such as news stories, other users' profiles, email to other users 101, chat rooms provided via the social network provider 106, and so forth. Any type of user activity can be tracked or monitored via the monitoring module 206. The information, people, groups, stories, and so forth, with which the user 101 interacts, may be represented by one or more objects, according to exemplary embodiments. The monitoring module 206 may determine an affinity of the user 101 for subjects, other users 101, relationships, events, organizations, and the like according to users' 101 activities.

A display engine/GUI 208 may also be provided by the social network provider 106. The display engine/GUI 208 displays the one or more items of media content, profile information, and so forth to users 101. Users 101 can interact with the social network provider 106 via the display engine/GUI 208. For example, users 101 can select privacy settings, access their own user profile, access other users' 101 information available via the social network provider, and so forth, via the display engine/GUI 208. The mini-feed may be displayed in a field in the display engine/GUI 208.

A relationship database 210 is provided for storing relationship data about each user 101. In various embodiments, the viewing user 101*a* can specify relationships with one or more subject users 101*b* of the social network via the user profile, or by any other means. The viewing user 101*a* can assign categories, groups, networks, and so forth to the one or more subject users 101*b* with which the viewing user 101*a* has a relationship. The relationship, for example, may specify that the subject user 101*b* is a family member, a schoolmate, an ex-girlfriend, an esteemed rival, and so forth. Any type of relationship may be specified.

An activity database 210 is provided for storing activity data about each user 101. The activities may be tracked by the monitoring module 206. Activities monitored by the monitoring module 206 may be stored in the activity database 212. Activity entries in the activity database 210 may include a timestamp indicating time and date of the activity, the type of activity, the user 101 initiating the activity, any other users 101 who are objects of the activity, and the like. Activities may be stored in multiple databases, including the activity database, the profile database, the relationship database, and the like.

According to some embodiments, the social network provider 106 may determine a relationship for the user. For example, if user 101 establishes communications with another user 101 interested in flying private aircraft, the social network provider 106 may assign the relationship of fellow pilot. The social network provider 106 may inquire whether or not user 101 wants to add the other user 101 as a fellow pilot, in one instance. The social network provider 106 may utilize a common interest in flying as a variable to measure the user affinity, for flying and/or the fellow pilot without inquiring whether user 101 wants to add the other user 101 to their user's profile, according to some embodiments.

A relationship may be assigned based on a user's interaction with other users or with any type of content. The user 101 may have more than one relationship with other users 101 or with content, according to exemplary embodiments. For example, user's 101 brother qualifies as one type of relationship, while the fact that user's 101 brother attended the same university as user 101 may qualify as another relationship. Any number of relationships may be established for each user 101 and/or for each activity performed by the user 101 in the social network environment. A timestamp or other chronological indicia may be associated with entries in the relationship database 210.

According to exemplary embodiments, one or more networks may be provided for each user 101. For example, user 101 may have a network comprised of people grouped according to a university attended, a network comprised of people grouped according to the user's geographical location of residence, a network comprised of people grouped according to a common field of work, a network comprised of people grouped according to a particular business, and so forth. As discussed herein, a common network may establish a relationship between user 101 and other users 101 in the common network, for example.

Any type of network may be provided by the social network provider 106. In other words, a network may comprise people grouped according to any type of category, such as various social networks described herein, like "friends", "geographical location", and so forth. User 101 may specify the networks, the categories, subcategories, and so forth and/ or the networks, the categories, the subcategories, and so on may be predetermined by the social network provider 106. The networks, categories, the subcategories, and so forth may comprise a relationship with the user 101, as discussed herein, but do not necessarily comprise the only relationship user 101 has with the other users 101.

Although the social network provider 106 is described as being comprised of various components (the profile database 202, the communications interface 204, the monitoring module 206, the display engine/GUI 208, and the relationship database 210), fewer or more components may comprise the social network provider 106 and still fall within the scope of various embodiments.

The mini-feed engine 110 is configured to receive data about a particular user of a social network, e.g., the subject user 101*b*, and assemble a list of one or more activities to be displayed as news items about of the subject user 101*b*. The news items may be in the form of items of media content or any other content for display to the viewing user 101*a*. The mini-feed engine 110 may filter the activities according to privacy settings of the subject user 101*b* and/or priority settings of the viewing use. The mini-feed engine 110 may compile a dynamic list of a limited number of news items about the subject user 101*b* for display in a preferred order. The mini-feed engine 110 may provide the viewing user 101*a* with links related to various activities in the news items, and other links providing opportunities to participate in the activities.

Figure 3:
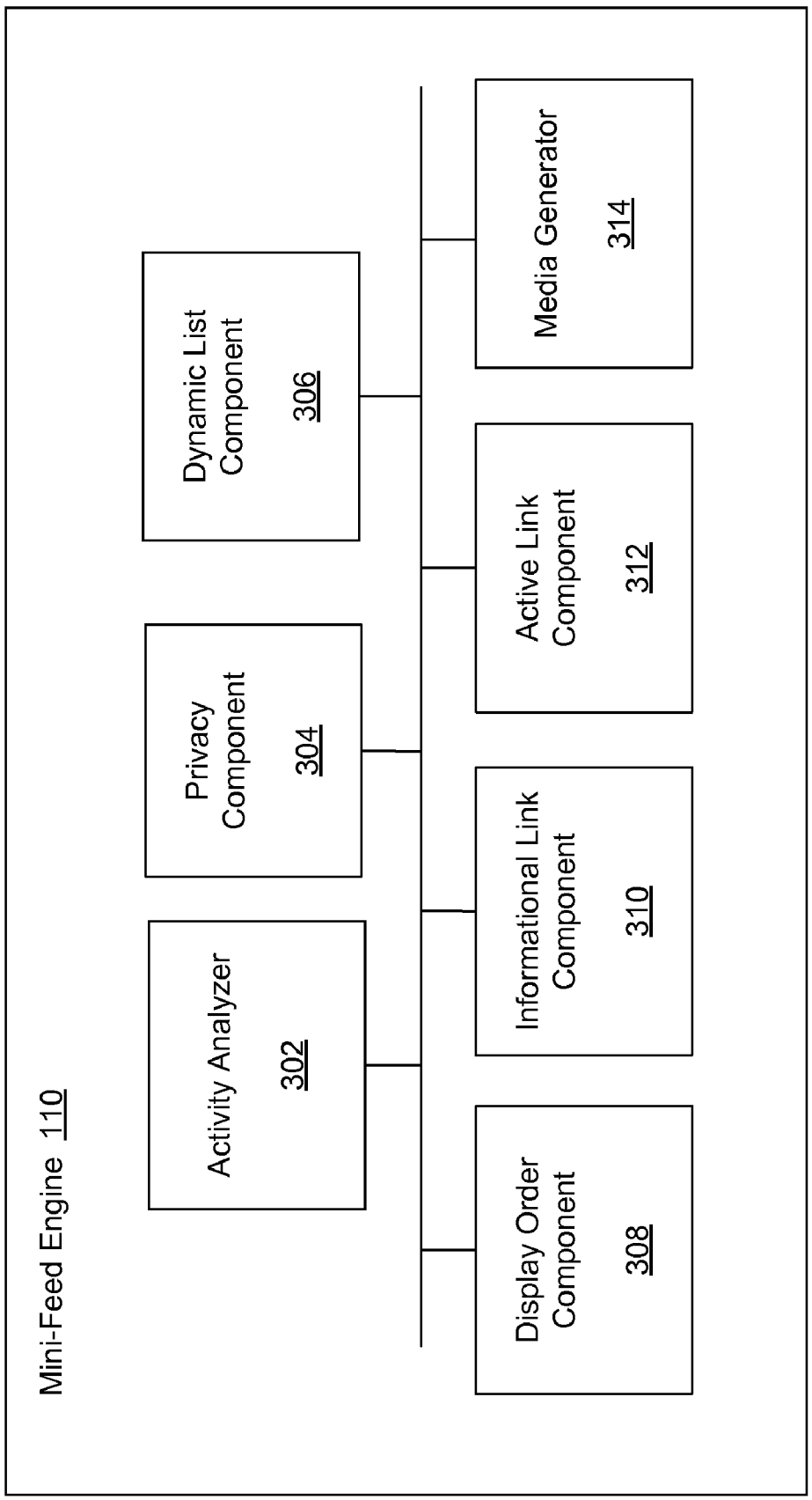
FIG. 3 is a block diagram of an exemplary mini-feed engine.

FIG. 3 is a block diagram of an exemplary embodiment of the mini-feed engine 110. The mini-feed engine 110 includes an activity analyzer 302, a privacy component 304, and a dynamic list component 306, for determining the activities regarding the subject user 101*b* that may be displayed as news items. The mini-feed engine 110 further includes a display order component 308, an informational component 310, an active link component 312 and a media generator 314, for displaying the news items to the viewing user 101*a*.

The activity analyzer 302 accesses the one or more user activities detected by the monitoring module 206 and analyzes the one or more user activities to compile a mini-feed activity list of activities associated with the subject user 101*b*. Optionally, the activity analyzer 302 may access the one or more activities from the various data bases (e.g., the profile database 202, the relationship database 210, the activity database 212, and the like). The activities may include activities performed by the subject user 101*b*, e.g., add an affiliation to a group, terminate an affiliation with a group, add information to the profile, remove information from the profile, RSVP to an event, withdraw the RSVP, activate a mobile connection, add a note to the notes file, add a photo to own photo album, approve a relationship request, create an event, create a group, create a photo album, manually add a link, and the like. The activities may include activities performed by other users 101 relating to the subject user 101*b* (e.g., the subject user 101*b* is approved by another for a relationship, the subject user 101*b* is mentioned by another user 101 in their notes, the subject user 101*b* receives a promotion, the subject user 101*b* is tagged by another user 101 in their photo album, and the like). The activities may include activities outside the social network, e.g., access an article from Wall Street Journal, book a vacation trip, and the like. Optionally, the subject user's 101*b* activities may be stored in a user activity storage medium (not shown) associated with the mini-feed engine 110 and/or the social network provider 106.

The privacy component 304 is configured to analyze the privacy settings of the subject user 101*b* and filter out activities belonging to categories that the subject user 101*b* has elected to not display in the mini-feed. For example, activities involving the subject user and the viewing user's wife may be designated as private by the subject user's 101*b* privacy settings and omitted from the mini-feed activity list displayed to the viewing user 101*a*. The privacy settings may be variable and prevent one particular user 101 from viewing activities regarding the subject user 101*b* that another particular user 101 might be permitted to see. For example, the subject user 101*b* might permit her sister to see activities regarding the subject user 101*b* and the viewing user's wife. The privacy component 304 may include default privacy settings. The default privacy settings may be determined by the social network provider 106. For further information regarding privacy see application entitled "Systems and Methods for Dynamically Generating a Privacy Summary," filed on Jul. 25, 2006.

The dynamic list component 306 is configured to limit the number of news items displayed. In some embodiments the dynamic list component 306 selects current activities, e.g., the most recent twenty activities according to the timestamp, for display as news items. In various embodiments, the dynamic list component 306 selects activities according to viewing user priorities (e.g., viewing user affinity), viewing user preferences (e.g., viewing user profile settings), subject user priorities (e.g., subject user affinity), subject user preferences (e.g., subject user profile settings), filters, and the like. For example, the viewing user 101*a* may set a filter for the dynamic list component 308 to show only relationship activities of the subject user 101*b* in the news items display. In another example, the dynamic list component 306 may display only the ten highest weighted activities of the subject user 101*b*, according to the affinity calculations for the viewing user 101*a*. For further information regarding affinity calculations see application entitled "Systems and Methods for Measuring User Affinity in a Social Network Environment." Optionally, the dynamic list may include a predetermined number of entries, e.g., 40 entries, and the news items may be selected according to the most recent 40 activities.

In some embodiments, the dynamic list component 306 may maintain a news feed for each user comprising a list of a predetermined number of news items (e.g., 40 entries) about the user. The dynamic list component 306 may place the most recent news item at the top of the list and remove the oldest news item from the bottom of the list for each new activity. Optionally, the dynamic list component may associate a unique mini-feed profile with each mini-feed for each user. The lowest priority news item may be removed according to the mini-feed profile, and a new news item may be added to a position on the list according to the relative priority of the new news item, according to the mini-feed profile.

The display order component 308 is configured to determine an order for the display of the news items. In some embodiments, the list of news items may be sorted according to a timestamp associated with the respective activities. In other embodiments, the list of news items may be sorted according to a viewing user priority (e.g., affinity determinations, viewing user preferences, and the like), a subject user priority (e.g., affinity determinations, subject user profile, and the like), alphabetical order of a field within the news item display, etc. In some embodiments, multiple field sorts may be applied to the news item display. For example, the viewing user 101*a* may configure his preferences to display relationship activities first followed by event activities second, etc., and to display the relationship activities (and then the event activities) in a chronological order.

The informational link component 310 is configured to provide the viewing user 101*a* one or more informational links to an activity of the subject user 101*b*. The informational links may provide the viewing user 101a additional information about the activity that is the subject of the news item. For example, an informational link may connect the viewing user 101a to a web page about a group that the subject user 101b has joined. In various embodiments, an informational link may enable the viewing user 101a to view a photo added to the subject user's 101b photo album, to view information about a class the subject user 101b has enrolled in, and the like.

The active link component 312 is configured to provide the viewing user 101a one or more active links to an activity of the subject user 101b. The active links may enable the viewing user 101a to participate in the activity that is the subject of the news item. For example, an active link may enable the viewing user 101a to join a group that the subject user 101b has joined. In various embodiments, an active link may enable the viewing user 101a to download a photo added to the subject user's 101b photo album, to enroll in a class the subject user 101b has enrolled in, to join a club the subject user 101b has joined, and so forth. In some embodiments, the active link and the informational link may enable the viewing user to perform the same function.

The media generator 314 is configured to format the activity list compiled by the activity analyzer 302 and display one or more news items according to the privacy component 304, the dynamic list component 306, and the display order component 308. The media generator 314 is further configured to provide functionality to any links attached by the informational link component 310 and/or the active link component 312. In some embodiments, the media generator component 310 provides the display to the news items to the display engine/GUI 208 for display to the viewing user 101a. Alternatively, the media generator 314 displays the news items to the viewing user 101a via the user device 102.

In some embodiments, the media generator 314 may be configured to attach advertising to the mini-feed display. Examples of advertising include, but are not limited to, a depiction of a product, a depiction of a logo, a display of a trademark, an inducement to buy a product, an inducement to buy a service, an inducement to invest, an offer for sale, a product description, trade promotion, a survey, a political message, an opinion, a public service announcement, news, a religious message, educational information, a coupon, entertainment, a file of data, an article, a book, a picture, travel information, and the like. The format of the advertising may include, singularly or in combination, an audio or animation or other multimedia element played at various times, banner advertising, network links, e-mail, images, text messages, video clips, audio clips, programs, applets, cookies, scripts, and the like.

Although the mini-feed engine 110 is described as being comprised of various components (e.g., the activity analyzer 302, the privacy component 304, the dynamic list component 306, the display order component 308, the informational link component 310, the active link component 312, and the media generator 314), fewer or more components may comprise the mini-feed engine 110 and still fall within the scope of various embodiments.

Figure 4:
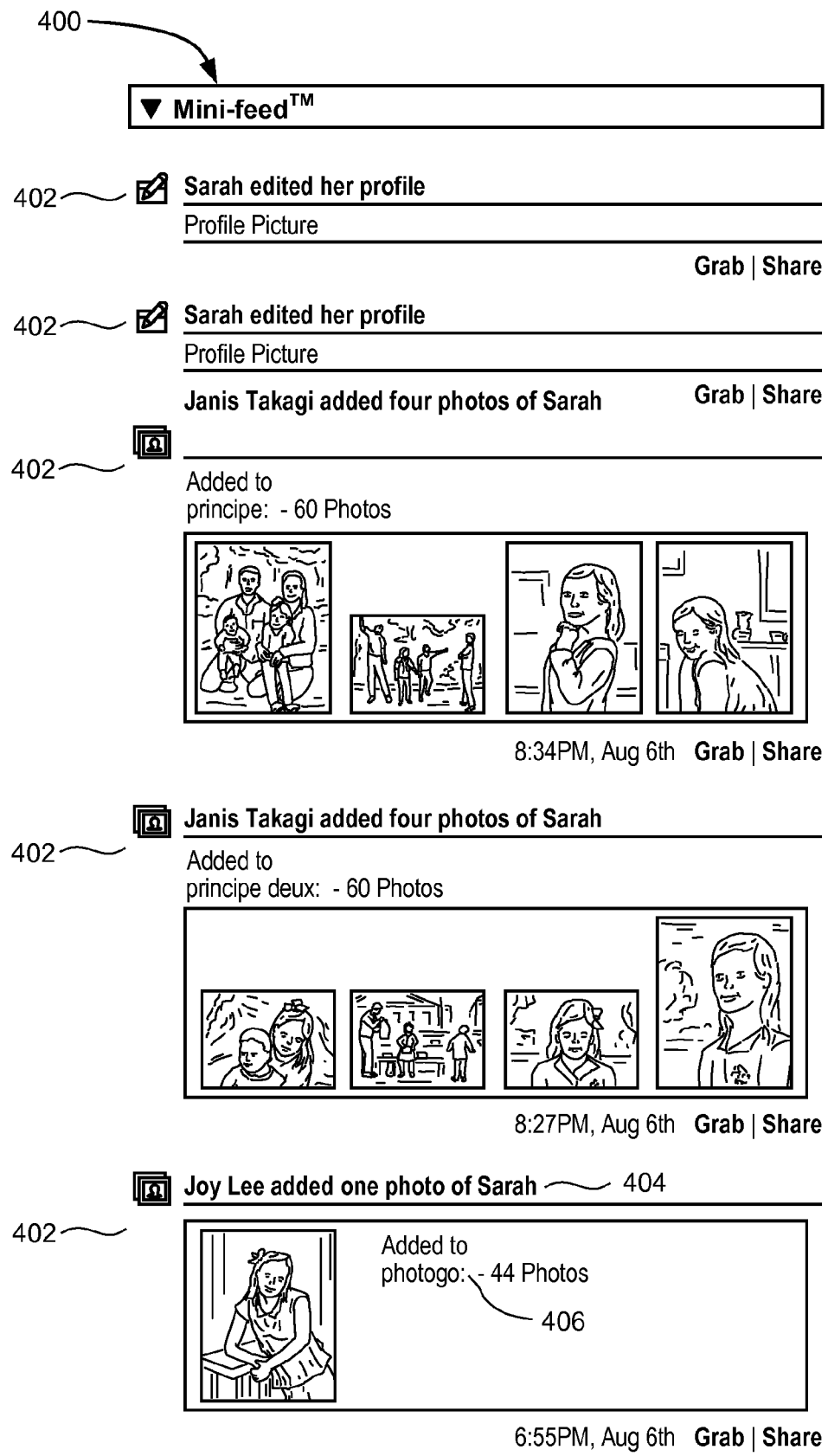
FIG. 4 is an exemplary screen shot of one or more news items displayed to the viewing user 101*a*.

FIG. 4 is an exemplary screen shot 400 of one or more news items 402 displayed to the viewing user 101a. The exemplary screen shot 400 represents a display page showing six news items 402 regarding a subject user named "Sarah." However, more or fewer than six news items 402 may be displayed. The total number displayed may be limited by the dynamic list component 306. Various stories, content, media, and so forth may be displayed in the news items 402 via the display page.

In the exemplary screen shot shown in FIG. 4, news items in the form of stories and/or story headlines are displayed.

The news items 402 include activities. An exemplary activity 404 indicates that "Joy Lee added one photo of Sarah." The activities may be described by text. In some embodiments, an informational link 406 may be attached to one or more of the news items 402. The informational links may provide additional information about the activity 404. The exemplary informational link 40 may, for example, enable the viewing user 101a to view Joy Lee's photo album, named "photogo." In various embodiments, the informational links may enable the viewing user 101a to link to another web page, view a photo, obtain information about an organization, link to a user profile, view information about an event, view a user's notes, and so forth. In some embodiments, the informational link may include a dropdown menu with multiple selections. A news item may include multiple informational links or one informational link.

In some embodiments, an active link 408 may be attached to one or more of the news items 402. The active links enable the viewing user 101a to participate in the same activity or a similar related activity as the subject user 101b, or take a related action. For example, the exemplary informational link 408 includes two links, i.e., "grab" and "share". "Grab" may enable the viewing user 101a to download a photo from Joy Lee's photo album. "Share" may enable the viewing user 101a to forward the photo from Joy Lee's photo album to someone else. In various embodiments, an active link enables the viewing user 101a to add an affiliation, participate in an event, create their own event, download a note, join a group, add a link, add a relationship tag another user's photo album and so forth. In some embodiments, the active link may include a dropdown menu with multiple selections. In some embodiments the active link and informational link may include the same link. A news item may include multiple active links or one active link.

Figure 5:
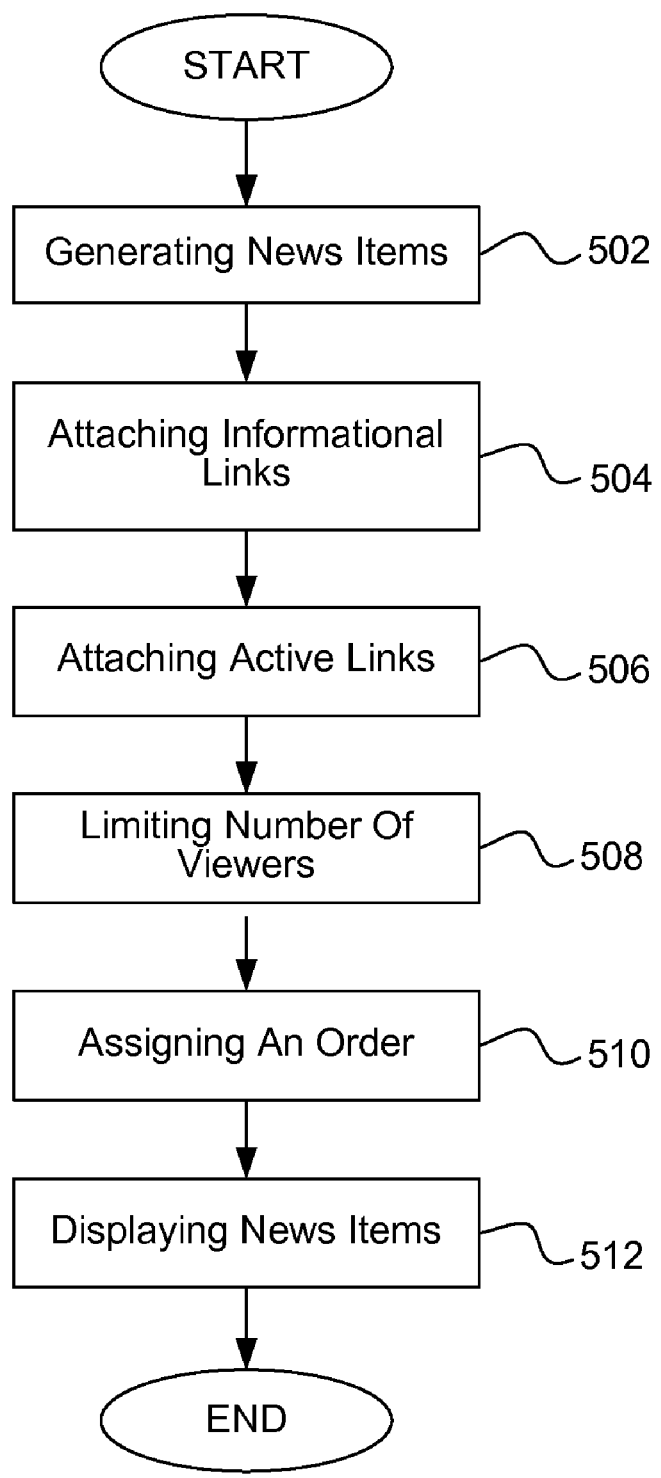
FIG. 5 is a flow diagram of an exemplary process for generating and displaying a news feed in a social network environment.

Referring now to FIG. 5, a flow diagram of an exemplary process for generating and displaying a news feed about activities of a user of a social network is provided. At step 502, news items relating to activities performed by a subject user 101b associated with a social network environment are generated. For example, the activity analyzer 302 may collect a list of one or more activities associated with the subject user 101b from monitoring module 206 and optionally from the various databases in the social network (e.g., the profile database 202, the relationship database 210, the activity database 212, and the like). The list of activities may include emails, viewing of user profiles, viewing of users' photos, receiving a promotion, sending messages to other users, and so forth, as discussed herein. The list of activities may be filtered according to preferences set by the viewing user and/or the subject user.

At step 504, informational links may be attached to one or more news items generated in the step 502. For example, the informational link component 310 may determine relevant links relating to activities to attach to one or more of the news items. As another example, the subject user 101b may begin to cohabitate with her girlfriend and thus the relationship database 210 may provide a news item regarding the establishment of the cohabitation relationship. A link to the subject user's 101b girlfriend may be attached by the informational link component 310 to the news item at the step 504, enabling the viewing user 101a to view entries regarding the girlfriend. In some embodiments, the informational link may be a dropdown menu including, for example, the girlfriend's email address, a link to her public profile, and a mini-feed about the girl friend.

At step 506, an active link may be attached to one or more news items generated in the step 502. For example, the active link component 312 may attach an active link to the news item regarding the establishing the cohabitation relationship (discussed elsewhere) enabling the viewing user 101a to email congratulations to the girlfriend. In some embodiments, the active link may be a dropdown menu providing a selection from a list of actions including, for example, a download link to the girlfriend's photo, an invitation to join the circle of the girlfriend's mutual friends, and a link to join her next Bodacious Beer Bust Binge.

At step 508, the number of users who may view the mini-feed may be limited. For example, the privacy component 304 may limit display of the mini-feed to only users of the social network. In various embodiments, the privacy component 304 may limit display of selected news items according to a privacy profile stored in the profile database 202 for the subject user 101b. Alternatively, the privacy component 304 may limit the mini-feed display to selected users according to the privacy profile stored in the profile database 202 for the subject user 101b. In some embodiments, the privacy component may filter the activities available for display according to a privacy profile. The privacy component 304 may limit display of the mini-feed according to default privacy settings. Other components and/or modules may also limit the display.

At a step 510, an order is assigned to the news items. For example, the display order component 308 may sort the news items according to chronological order at step 510. In various embodiments, the display order component 308 may assign the order of the news items according to a viewing user priority (e.g., affinity determinations, viewing user preferences, and the like), a subject user priority (e.g., affinity determinations, subject user profile, and the like), alphabetical order of various fields within the news item display, etc. In some embodiments, the display order component 308 may apply multiple field sorts to the news item display. For example, the viewing user 101a may configure his preferences to display relationship activities first followed by event activities second, etc., and to display the relationship activities in a chronological order followed by the event activities in chronological order.

At step 512, the news items are displayed to the viewing user 101a. For example, the media generator 314 may format the activity list compiled in step 502 and display one or more news items according to limits imposed on the scope of the viewers at step 508, and the display order assigned at step 510. Displaying the news items at step 512 further includes displaying links attached to the news item at step 504 and/or 506, and linking the viewing user 101a to those links selected by the viewing user 101a. For example, links attached by the informational link component 310 and/or the active link component 312 may also be displayed at step 312 by the media generator. In some embodiments, advertising may be displayed at step 512. In various embodiments, the active links and/or passive links may include links to advertising. Optionally, the news items may be displayed by the display engine/GUI 208.

Although the process for generating and displaying a news feed is described as being comprised of various steps (e.g., generating news items 502, attaching informational links 504, attaching active links 506, limiting the number of viewers 508, assigning an order 510, displaying news items 512), fewer or more steps may comprise the process and still fall within the scope of various embodiments.

Several embodiments are specifically illustrated and/or described herein. However, it will be appreciated that modifications and variations are covered by the above teachings and within the scope of the appended claims without departing from the spirit and intended scope thereof. For example, affinity values may be modified by acts of selecting links for access in the mini-feed display. The news items in the mini-feed may be searched for a predetermined character string (e.g., a particular name or subject). A filter may be applied to the news items to remove predetermined content, for example, content about subjects in which the viewing user is not interested. The order of the news items in the mini-feed display may be determined by affinity information regarding the viewing user 101a. Any of the elements associated with the mini-feed engine may employ any of the desired functionality set forth hereinabove. Items selected for deletion from the mini-feed display list may be determined according to first in first out. Items selected for deletion from the mini-feed display list may be determined according to affinity information. Method steps described herein may be performed in alternative orders. Various embodiments of the invention include logic stored on computer readable media, the logic configured to perform methods of the invention. The examples provided herein are exemplary and are not meant to be exclusive.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method comprising:
monitoring a plurality of activities in a social network environment, wherein one or more of the activities relate to a user and are performed by other users;
storing the monitored activities in a database;
for each of one or more of the activities that relates to the user and was performed by another user, generating a story;
receiving a request from a viewing user for a page of information about the user;
selecting, by a social networking system, a plurality of the generated stories that relate to the user and describe an activity that was performed by another user;
generating a page of information about the user, where the page of information comprises a listing of one or more of the selected stories; and
providing the page of information about the user to the viewing user for display.

2. The method of claim 1, further comprising:
attaching a link associated with at least one of the activities of another user to at least one of the plurality of stories in the listing of generated stories, wherein the link enables the viewing user to participate in the same activity as the another user.

3. The method of claim 2, wherein a link is attached to a story about another user's RSVP to an event, and the link enables the viewing user to RSVP to the event.

4. The method of claim 2, wherein a link is attached to a story about another user's addition of a photo, and the link enables the viewing user to view the photo.

5. The method of claim 2, wherein a link is attached to a story about another user's addition of a photo, and the link enables the viewing user to add another photo.

6. The method of claim 2, wherein a link is attached to a story about another user's addition of an affiliation with a group in the social network environment, and the link enables the viewing user to add an affiliation with the group.

7. The method of claim 1, wherein the listing comprises a story about an activity, where the activity is that the user was tagged by another user used in a photo.

8. The method of claim 1, wherein the listing comprises a story about an activity, where the activity is that the user was approved by another user for a relationship.

9. The method of claim 1, wherein the listing comprises a story about an activity, where the activity is that the user was mentioned by another user in a posting in the social networking system.

10. The method of claim 1, wherein the listing of one or more of the stories comprises one or more stories about an activity outside the social networking system.

11. The method of claim 1, wherein the listing of one or more of the stories comprises one or more stories about activities of one or more users who are connected to the user in the social networking system.

12. The method of claim 1, wherein the listing of one or more of the stories comprises one or more stories about the user's own activities.

13. The method of claim 1, wherein the page of information comprises a web page.

14. The method of claim 1, further comprising:
selecting for the listing a set of stories based on an affinity of the stories with the viewing user.

15. The method of claim 1, further comprising:
storing a set of privacy settings established by the user; and
filtering one or more activities from the generated stories based on the user's privacy settings.

16. A method comprising:
monitoring a plurality of activities in a social networking system, wherein one or more of the activities relate to a user and are performed by other users;
storing the monitored activities in a database;
for each of one or more of the activities that relates to the user, generating a story;
receiving a request from a viewing user for a page of information about the user;
selecting, by a social networking system, a plurality of the generated stories that relate to the user and describe an activity that was performed by another user;
generating a page of information about the user, where the page of information comprises a listing of one or more of the selected stories;
attaching a link associated with at least one of the activities of another user to at least one of the plurality of stories in the listing of generated stories, wherein the link enables the viewing user to participate in the same activity as the another user; and
providing the page of information about the user to the viewing user for display.

17. The method of claim 16, wherein a link is attached to a story about another user's RSVP to an event, and the link enables the viewing user to RSVP to the event.

18. The method of claim 16, wherein a link is attached to a story about another user's addition of a photo, and the link enables the viewing user to view the photo.

19. The method of claim 16, wherein a link is attached to a story about another user's addition of a photo, and the link enables the viewing user to add another photo.

20. The method of claim 16, wherein a link is attached to a story about another user's addition of an affiliation with a group in the social network environment, and the link enables the viewing user to add an affiliation with the group.

21. The method of claim 16, wherein the listing comprises a story about an activity, where the activity is that the user was tagged by another user in a photo.

22. The method of claim 16, wherein the listing comprises a story about an activity, where the activity is that the user was approved by another user for a relationship.

23. The method of claim 16, wherein the listing comprises a story about an activity, where the activity is that the user was mentioned by another user in a posting in the social networking system.

24. The method of claim 16, wherein the listing of one or more of the stories comprises one or more stories about an activity outside the social networking system.

25. The method of claim 16, wherein the listing of one or more of the stories comprises one or more stories about activities of one or more users who are connected to the user in the social networking system.

26. The method of claim 16, wherein the listing of one or more of the stories comprises one or more stories about the user's own activities.

27. The method of claim 16, wherein the page of information comprises a web page.

28. The method of claim 16, further comprising:
selecting for the listing a set of stories based on an affinity of the stories with the viewing user.

29. The method of claim 16, further comprising:
storing a set of privacy settings established by the user; and
filtering one or more activities from the generated stories based on the user's privacy settings.

* * * * *

UNITED STATES PATENT AND TRADEMARK OFFICE
CERTIFICATE OF CORRECTION

PATENT NO. : 8,352,859 B2  
APPLICATION NO. : 12/703199  
DATED : January 8, 2013  
INVENTOR(S) : Mark E. Zuckerburg et al.

Page 1 of 1

It is certified that error appears in the above-identified patent and that said Letters Patent is hereby corrected as shown below:

Title Page, Inventor item (75) delete "Germinder" and insert --Geminder--

Signed and Sealed this  
Twenty-fourth Day of September, 2013

Teresa Stanek Rea  
*Deputy Director of the United States Patent and Trademark Office*